United States Patent
Jia et al.

(10) Patent No.: US 10,313,452 B2
(45) Date of Patent: *Jun. 4, 2019

(54) MIGRATING A CHAT MESSAGE SERVICE PROVIDED BY A CHAT SERVER TO A NEW CHAT SERVER

(71) Applicant: Facebook, Inc., Menlo Park, CA (US)

(72) Inventors: Hongzhong Jia, Cupertino, CA (US); Xiaojun Liang, San Jose, CA (US); Li Hua, Bellevue, WA (US); Goranka Bjedov, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/432,827

(22) Filed: Feb. 14, 2017

(65) Prior Publication Data
US 2017/0214751 A1    Jul. 27, 2017

Related U.S. Application Data

(63) Continuation of application No. 13/531,399, filed on Jun. 22, 2012, now Pat. No. 9,608,831.

(51) Int. Cl.
*H04L 29/08* (2006.01)
*H04L 12/18* (2006.01)
*H04L 12/58* (2006.01)

(52) U.S. Cl.
CPC ........ *H04L 67/148* (2013.01); *H04L 12/1813* (2013.01); *H04L 51/04* (2013.01); *H04L 67/1027* (2013.01); *H04L 67/1036* (2013.01)

(58) Field of Classification Search
CPC .............. H04L 67/148; H04L 67/1027; H04L 67/1036; H04L 12/1813; H04L 51/04

USPC .................................................. 709/203–206
See application file for complete search history.

(56) References Cited

U.S. PATENT DOCUMENTS

| | | | |
|---|---|---|---|
| 5,951,694 A | 9/1999 | Choquier | |
| 6,675,217 B1 | 1/2004 | Dani | |
| 6,788,949 B1 | 9/2004 | Bansal | |
| 7,484,208 B1 * | 1/2009 | Nelson | G06F 9/45558 711/6 |
| 7,552,218 B2 * | 6/2009 | Kaluskar | G06F 17/30575 709/227 |
| 8,069,218 B1 | 11/2011 | Tormasov | |

(Continued)

OTHER PUBLICATIONS

Nelson, Michael, Beng-Hong Lim, and Greg Hutchins. "Fast Transparent Migration for Virtual Machines." in USENIX Annual technical conference, general track, pp. 391-394. 2005.*

(Continued)

*Primary Examiner* — Suraj M Joshi
*Assistant Examiner* — Melaku Y Habtemariam
(74) *Attorney, Agent, or Firm* — Van Pelt, Yi & James LLP

(57) ABSTRACT

A chat messaging service provided for a chat user is migrated. At a second chat server from a first chat server, static information associated with a chat user is received. At the second chat server from the first chat server, dynamic information associated with the chat user is received. At least a portion of the dynamic information is received after the chat user is indicated as being associated with the migration state. After the chat user is no longer indicated as being associated with the migration state, a chat message for the chat user is received at the second chat server.

20 Claims, 5 Drawing Sheets

(56) References Cited

U.S. PATENT DOCUMENTS

| | | | |
|---|---|---|---|
| 8,078,622 B2 | 12/2011 | Rabii | |
| 8,346,934 B2 | 1/2013 | Okamoto | |
| 8,386,609 B2* | 2/2013 | Anand | H04L 65/1083 709/224 |
| 8,452,855 B2 | 5/2013 | Higgins | |
| 2002/0161896 A1* | 10/2002 | Wen | H04L 12/1827 709/227 |
| 2003/0069903 A1* | 4/2003 | Gupta | G06F 17/30306 |
| 2005/0083862 A1 | 4/2005 | Kongalath | |
| 2006/0212453 A1 | 9/2006 | Eshel | |
| 2007/0226323 A1 | 9/2007 | Halpern | |
| 2008/0080526 A1 | 4/2008 | Gounares | |
| 2011/0149750 A1 | 6/2011 | Sharma | |
| 2012/0042034 A1 | 2/2012 | Goggin | |
| 2013/0083690 A1* | 4/2013 | Cardona | H04L 69/12 370/254 |

OTHER PUBLICATIONS

Panitzek, Kamill. "Concepts for service provision in disaster environments." In Pervasive Computing and Communications Workshops (PERCOM Workshops), 2012 IEEE International Conference on, pp. 558-559, IEEE, 2012.

* cited by examiner

MIGRATING A CHAT MESSAGE SERVICE PROVIDED BY A CHAT SERVER TO A NEW CHAT SERVER

CROSS REFERENCE TO OTHER APPLICATIONS

This application is a continuation of co-pending U.S. patent application Ser. No. 13/531,399 entitled MIGRATING A CHAT MESSAGE SERVICE PROVIDED BY A CHAT SERVER TO A NEW CHAT SERVER filed Jun. 22, 2012 which is incorporated herein by reference for all purposes.

BACKGROUND OF THE INVENTION

Instant chat messaging services allow one user to message another user in real-time as well as when a recipient user is offline. User information for a specific chat user, such as user availability, whether a chat message has been delivered to a user, and contents of a chat message are usually processed and maintained by a single chat server because providing the chat messaging service requires efficient maintenance and utilization of user state information. However, once a chat user has been assigned to a specific chat server, it is difficult to use a different chat server to handle a chat session of the chat user if it becomes difficult or undesirable to handle the chat session of the user using the current chat server. Not only does user information need to be migrated to the different chat server, it is desirable to minimally impact the chat session of the user that may be currently engaging in a real-time chat conversation during the migration. Therefore there exists a need for a way to migrate information and processing provided by a chat server for a chat user to a different chat server in a way that minimizes adverse impact on the chat user.

BRIEF DESCRIPTION OF THE DRAWINGS

Various embodiments of the invention are disclosed in the following detailed description and the accompanying drawings.

DETAILED DESCRIPTION

Figure 1:
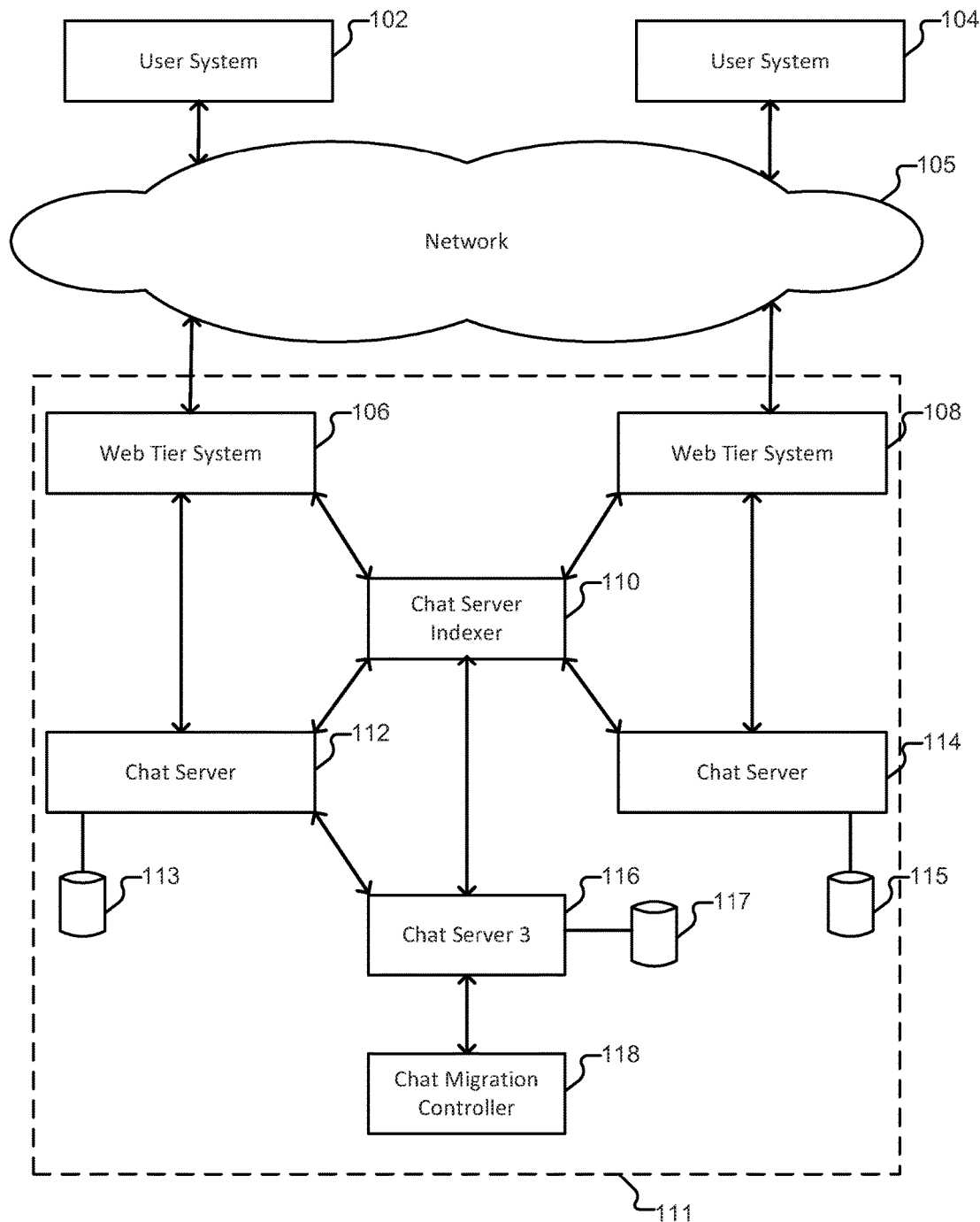
FIG. 1 is a block diagram illustrating an embodiment of a system for providing chat messaging services.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Migrating a chat messaging service provided for a chat user is disclosed. In some embodiments, it is desirable to minimize the amount of time a chat user is flagged as being in a migrating state and unable to receive a new chat message. Without interrupting the chat messaging services for a user, static information and dynamic information of a chat user are transferred from a current chat server to a new chat server. The chat user is then flagged as being in a migrating state (e.g., a state where new chat messages are queued and not processed) and any updated dynamic information since the previous dynamic information transfer is transferred. Because a large amount of information, including the static information and previous dynamic information, has been already migrated, the amount of information (e.g., only the updated dynamic information) migrated while the user is flagged has been reduced. Once the updated dynamic information has been migrated, the new chat server is able to provide chat message services for the user.

In various embodiments, a chat messaging service includes providing a service that enables one user to send a chat message to another user. The chat message may be delivered in real-time (e.g., as an online instant message) via a substantially instantaneous transmission of the message from a sender to one or more receiver(s) (e.g., a plurality of users and/or plurality of devices of a user) or when the receiver is able receive the message at a later time (e.g., an offline user receives the message when the user becomes available). The chat message may include one or more of the following: text, an emoticon, an image, a hyperlink, audio, and video. In some embodiments, a status of a chat user is tracked. For example, a user may be online, offline, busy, available, idle, and/or other predetermined or user defined states. The state of the user may be determined automatically (e.g., by detecting when the user logged on or off to a chat messaging service or by tracking device/computer usage of a user) or defined by a user. One user may be able to view the status of another user. In some embodiments, processing and/or delivery of a chat message is based at least in part on the status of a receiving user and/or the status of a sending user.

FIG. 1 is a block diagram illustrating an embodiment of a system for providing chat messaging services. User system 102 is associated with a first user using user system 102 to access chat messaging services and user system 104 is associated with a second user using user system 104 to access chat messaging services. User system 102 and user system 104 are each included in a user device such as a mobile phone, tablet computer, laptop computer, desktop computer, vehicle computer, or any other device that a user may use to access chat messaging services. Using a system such as system 102 or 104, a user may access chat messaging services using an internet browser or an application running on the system. System 102 and 104 are connected to network 105. Examples of network 105 include one or more of the following: a direct or indirect physical communication connection, mobile communication network, Internet, intranet, Local Area Network, Wide Area Network, Storage Area Network, and any other form of connecting two or more systems or storage devices together. The number of components and the connections shown in FIG. 1 are merely illustrative. Other components and connections between the objects shown in FIG. 1 may exist. For example, one or more components of service provider system 111 may be connected to network 105 and may communicate with another component in system 111 via network 105.

Service provider system 111 includes a plurality of components used offering chat messaging service to user system 102 and user system 104. For example, the components included in service provider system 111 are managed by a service provider offering chat messaging service to users. Web tier system 106 and 108 process and manage communication to and from user systems such as systems 102 and 104 via network 105. For example, web tier system 106 and 108 provide and handle a communication interface and management between an end-user system and component systems of a chat messaging service provider. User system 102 communicates with a chat client of web tier system 106 to utilize chat messaging services provided by system 111 and user system 104 communicates with a chat client of web tier system 108 to utilize chat messaging services provided by system 111. Although the example shows two user systems utilizing different web tier systems, a plurality of user systems may utilize a single web tier system.

A user of chat messaging service is associated with at least one chat server. In the example shown, a user of user system 102 is associated with chat server 112. Chat server 112 processes, manages, and stores information associated with chat messaging services provided to the user. Information of the user associated with chat server 112 is stored in associated storage 113. For example, information such as received chat messages, status of whether a received chat message was delivered to the user, and the availability status of the user is stored in storage 113. Storage 113 may be included in chat server 112, connected to chat server 112, and/or networked with chat server 112. Similarly, a user of user system 104 is associated with chat server 114. Chat server 114 processes, manages, and stores information associated with chat messaging services provided to the user. Information of the user associated with chat server 114 is stored in associated storage 115. For example, information such as received chat messages, status of whether a received chat message was delivered to the user, and the availability status of the user is stored in storage 115. Storage 115 may be included in chat server 114, connected to chat server 114, and/or networked with chat server 114. One chat server may provide chat messaging services to a plurality of users.

Chat server indexer 110 can be used by web tier system 106 and 108 to determine the chat server associated with a chat user. Chat server indexer 110 communicates with chat servers to maintain a directory of users and associated chat servers. For example, when a first user using user system 102 sends a chat message to a second user of user system 104, system 102 contacts web tier system 106 via network 105. Web tier system 106 contacts chat server indexer 110 to obtain information that identifies chat server 114 as the chat server that handles a chat session of the second user. Then web tier system 106 sends to chat server 114 the first user's chat message to be delivered to the second user. If chat server 114 determines that the second user is in a state to receive the message, chat server 114 sends the message to web tier system 108 that delivers the message to user system 104 via network 105. In another example, if the first user of user system 102 updates an availability status of the first user, user system 102 sends the status update to web tier system 106. Web tier system 106 has determined that the first user is handled by chat server 112 using information provided by chat server indexer 110, and web tier system 106 forwards the status update to chat server 112 that updates the availability status of the first user using storage 113.

In certain circumstances it may be desired to allow another chat server to handle chat messaging services associated with the user of user system 102. For example, chat server 112 may be overloaded with too many users and it may be desired to handle chat messaging services for the user of system 102 with another chat server. In the example shown, chat server 116 will become the new chat server associated with the user of system 102. The user's information stored in storage 113 will also need to be transferred to storage 117 associated with chat server 116. Chat migration controller 118 communicates with chat server 116 to manage the migration of chat messaging services provided for the user from chat server 112 to chat server 116.

Figure 2:
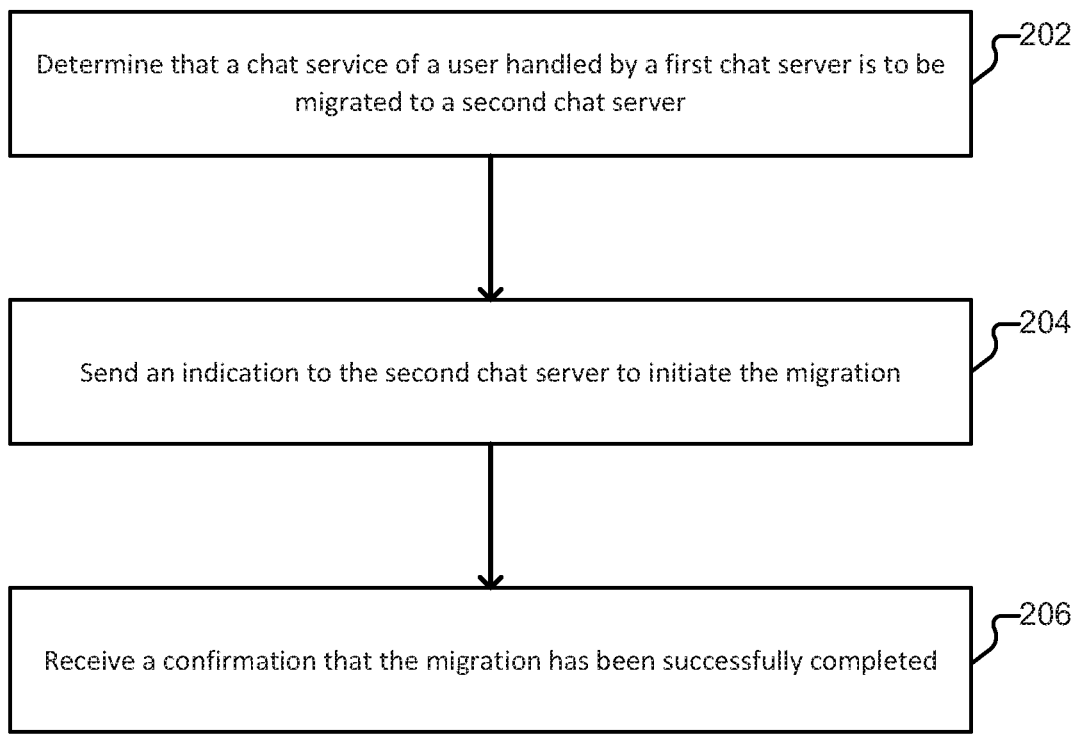
FIG. 2 is a flow chart illustrating an embodiment of a process for initiating a migration of chat messaging services provided for a user to a new chat server.

FIG. 2 is a flow chart illustrating an embodiment of a process for initiating a migration of chat messaging services provided for a user to a new chat server. In some embodiments, the process of FIG. 2 is at least in part implemented in chat migration controller 118 in FIG. 1. At 202, it is determined that a chat messaging service of a user handled by a first chat server is to be migrated to a second chat server. For example, it is determined that processing and storage of chat messaging information of a user of user system 102 handled by chat server 112 is to be migrated and handled by chat server 116 of FIG. 1. In some embodiments, the determination made at 202 is at least in part made because it is detected that a processing and/or storage resource of the first chat server has reached or exceeded a threshold level. For example, the first chat server may be overloaded because it has been assigned to handle too many users utilizing chat messaging services concurrently.

In some embodiments, the determination made at 202 is made at least in part by monitoring one or more chat servers. For example, chat migration controller 118 monitors chat servers shown in FIG. 1 periodically. In some embodiments, a chat server sends a message to a chat migration controller to indicate that a processing and/or storage resource of the chat server has reached a threshold level. In some embodiments, the determination made at 202 is made at least in part by analyzing chat servers that are currently involved in the process of migrating handling of chat messaging services for a user. For example, a chat server that is involved in the migration is not selected as a source or a target of another migration until the current migration has been completed. In various embodiments, the determination made at 202 is made at least in part due to one or more of the following: a user indication, a maintenance of a chat server, an update of a chat server, an upgrade of a chat server, an error indication of a chat sever, a failure of a chat server, an indication of a potential failure of a chat server, and a result of a load balancing algorithm.

In some embodiments, the second chat server (i.e., destination of the migration) is selected at least in part by analyzing a metric associated with the chat server. For example, the server with the lowest current utilization level, lowest historical utilization level, lowest number of associated users, and/or highest reliability metric may be selected as the destination chat server. In some embodiments, the destination chat server is selected randomly, sequentially, or algorithmically among a group of specified chat servers and/or a group of chat servers that meet a threshold metric. In some embodiments, the destination chat server is specified by a system administrator, a programmer, or any other type of user or administrator. In some embodiments, the associated user to be migrated is selected amongst the group of users associated with the first server based at least in part on one or more of the following: a random selection, a sequential selection, a utilization metric associated with the user, a size of data associated with the user, and a time value associated with the user. In some embodiments, the associated user migrated in 202 is one of a group of users of the first chat server being migrated concurrently to the second chat server and/or a group of chat servers. In some embodiments, the associated user migrated in 202 is one of a group of users being migrated serially to the second chat server and/or a group of chat servers. In some embodiments, the associated user migrated in 202 is one of an entire group of all users of the first chat server being migrated to the second chat server.

At 204, an indication to the second chat server is sent to initiate the migration. In some embodiments, the indication indicates an identifier of the associated user to be migrated and/or an identifier of the first server. In another embodiment, the indication is sent to the first chat server rather than the second chat server to initiate the migration. In some embodiments, the indication is sent to both the first and second servers to initiate the migration.

At 206, a confirmation that the migration has been successfully completed is received. In various embodiments, the confirmation may be received from the first chat server and/or the second chat server. In some embodiments, using the confirmation, another migration may be initiated and/or a migration source or destination for a future migration may be determined. In other embodiments, instead of a confirmation, an indication that the migration has not been successfully completed is received. Due to this indication, the migration may be reattempted, attempted using a different (source and/or destination) chat server, attempted using a different associated user to be migrated, and/or indicated as unsuccessful using an error message.

Figure 3:
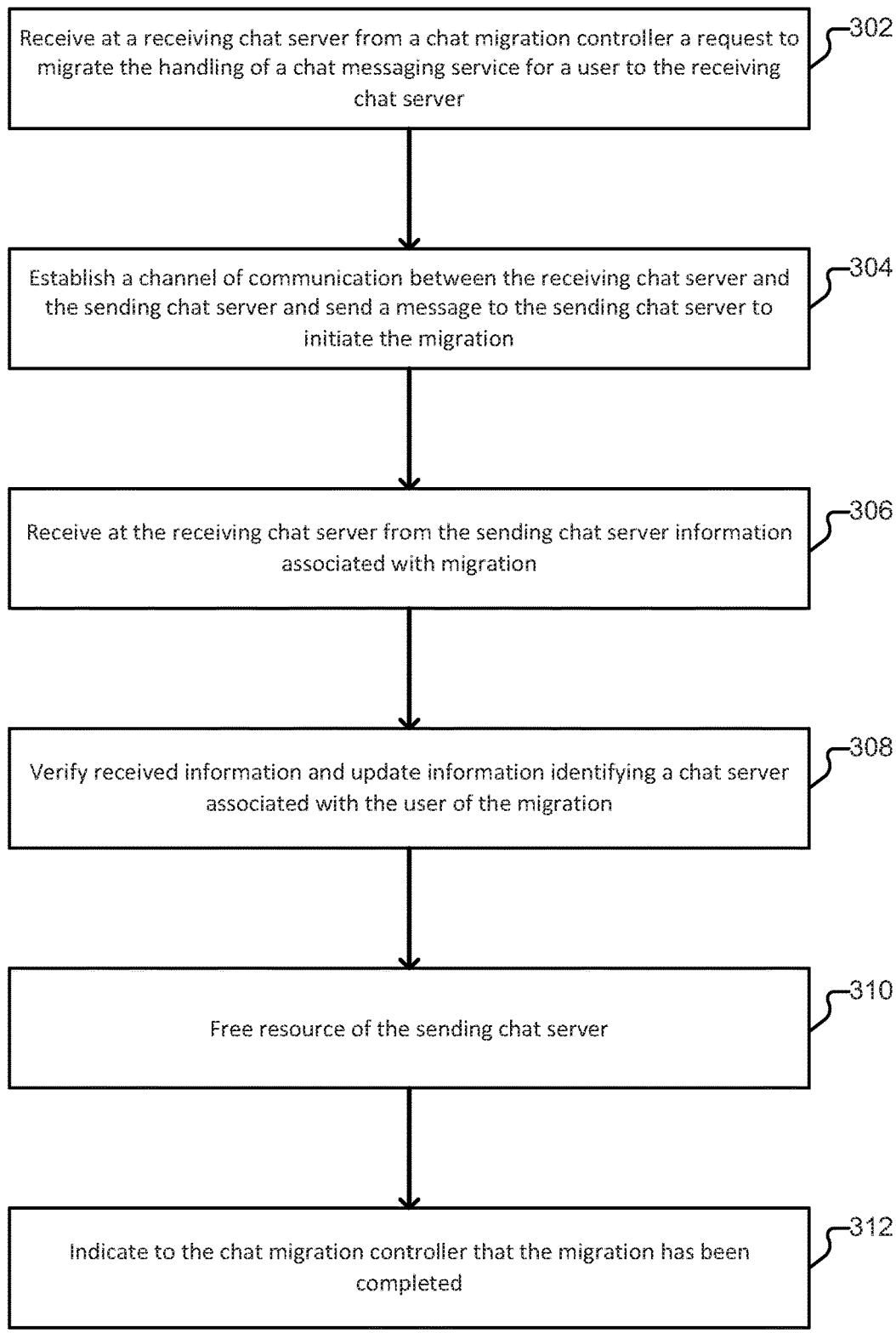
FIG. 3 is a flow chart illustrating an embodiment of a process for migrating to a new chat server, chat messaging services provided for a user.

FIG. 3 is a flow chart illustrating an embodiment of a process for migrating to a new chat server, chat messaging services provided for a user. In some embodiments, the process of FIG. 3 is at least in part implemented in at least one of the chat servers shown in FIG. 1. For example, the process of FIG. 3 is implemented in chat server 116 of FIG. 1.

At 302, from a chat migration controller, a request is received at a receiving chat server to migrate from a sending chat server to a receiving chat server the handling of a chat messaging service for a user to the receiving chat server. In some embodiments, the request received at 302 includes the indication sent in 204 of FIG. 2. In some embodiments, the request includes an identifier of the associated user to be migrated and/or an identifier of the sending chat server.

At 304, a channel of communication is established between the receiving chat server and the sending chat server and a message is sent via the channel to the sending chat server to initiate the migration process. In some embodiments, the message includes an identifier of the associated user to be migrated. In some embodiments, establishing the channel of communication includes opening an HTTP (Hypertext Transfer Protocol) socket or another communication interface of a communication protocol.

At 306, at the receiving chat server, information associated with the migration is received from the sending chat server. In various embodiments, the received information includes one or more of the following: a content of a chat message received for the user, metadata associated with a received chat message, an indication of whether a chat message has been delivered to the user, a chat message archive, profile information associated with the user, a user identification, a user status information, and other static and dynamic state information associated with the user. In some embodiments, received information is received in a plurality of groupings. For example, static information may be first received and then dynamic information may be received. In some embodiments, at least a portion of the information to be migrated is received while the sending chat server is able to actively process any newly received chat message for the user of the migration. In some embodiments, the sending chat server is suspended from modifying or otherwise altering information to be migrated while at least a portion of the information is being migrated. For example, sending chat server is flagged as being unavailable with respect to the user being migrated while at least a portion of the information is migrated. The sending chat server may be identified as being in a migrating (e.g., suspended) state by a chat server indexer such as chat server indexer 110 of FIG. 1. Additional details on the suspended state of a chat server are described later in the specification in conjunction with FIGS. 4 and 5.

At 308, the received information is verified and information identifying a chat server associated with the user of the migration is updated. For example the information is updated to associate the receiving chat server as the chat server associated with the user. In some embodiments, verifying the received information includes verifying one or more of the following: the received information has not been corrupted during the transmission, all expected and/or necessary information to migrate chat messaging services for the user has been received, the received information is consistent, and the received information includes specified information. Once the received information has been verified, in some embodiments, the received information is used by the receiving chat server to prepare the receiving chat server to provide chat messaging service to the user. For example, the received information is at least in part stored in a storage associated with the receiving chat server. In some embodiments, the information identifying the chat server associated with the user is updated after the receiving chat server is ready to handle chat messaging services for the user.

In some embodiments, updating the information includes sending an update communication to a chat server indexer such as chat server indexer 110 of FIG. 1 to update its information associated with the user affected by the migration. For example, the chat server indexer includes information that maps a chat user to a specific chat server configured to provide the chat messaging services to the chat user and, based on the update communication sent to the chat server indexer, the information associated with the migrated user is updated to be mapped to the new receiving chat server. A new chat message now sent to the chat user will result in the receiving chat server being contacted based on the updated information provided by the chat server indexer. The receiving chat server now processes the new chat message for the chat user rather than the sending chat server. In some embodiments, due to the updated information, the new chat message is no longer held because a chat server of the chat user is no longer identified as being unavailable for the chat user. For example, a communication is sent to a chat server indexer, such as chat server indexer 110 of FIG. 1, to update its information associated with the chat user of the migration to indicate that the chat server associated with the chat user is no longer unavailable to receive new chat messages.

At 310, a resource of the sending chat server is freed. In some embodiments, step 310 is only performed after it is confirmed that step 308 has been successfully completed. In some embodiments, freeing the resource includes de-allocating, un-allocating, removing, deleting, updating, configuring, archiving, and/or otherwise processing a resource commitment or data associated with the chat user of the migration. For example, configuration of the sending chat server is updated to no longer support chat messaging services of the chat user and stored information on the chat user is deleted. Examples of the resource include memory, storage, processor, bandwidth, and other processing, communication, or storage resource.

At 312, it is indicated to the chat migration controller that the migration has been completed. In some embodiments, this indication includes the indication received in 206 of FIG. 2.

Figure 4:
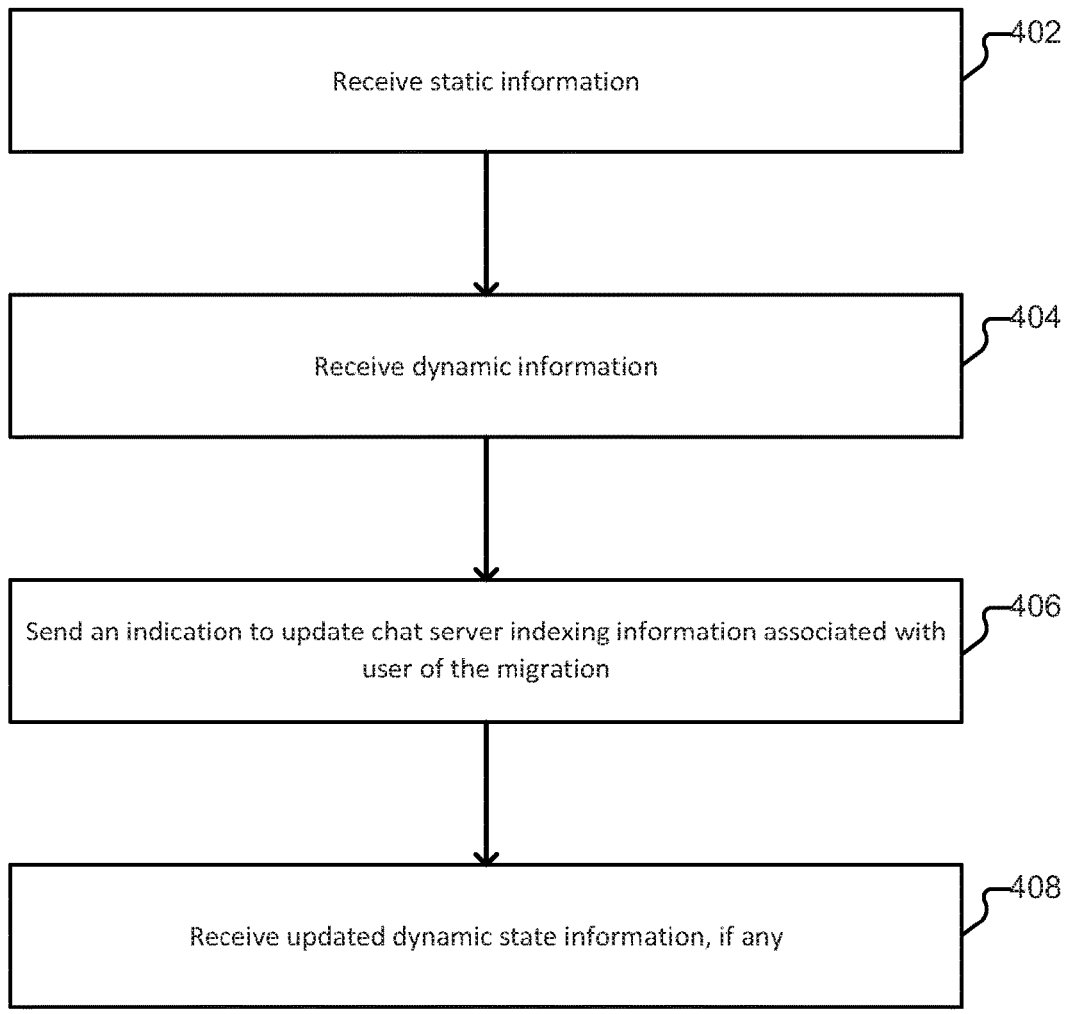
FIG. 4 is a flow chart illustrating an embodiment of a process for receiving information associated with the migrating to a new chat server, chat messaging services provided for a chat user.

FIG. 4 is a flow chart illustrating an embodiment of a process for receiving information associated with the migrating to a new chat server, chat messaging services provided for a chat user. In some embodiments, the process of FIG. 4 is included in 306 of FIG. 3. In some embodiments, the process of FIG. 4 is at least in part implemented in at least one of the chat servers shown in FIG. 1.

At 402, static information from a sending chat server is received at a receiving chat server. The static information is associated with the chat user associated with a migration of chat messaging services provided by the sending chat server to the receiving chat server. In some embodiments, the sending chat server is the sending chat server in the process of FIG. 3 and the receiving chat server is the receiving chat server discussed in the process of FIG. 3. In some embodiments, the static information of the user being migrated includes information that will not be changed, modified, or deleted during the migration process. Examples of the static information include an identifier, a configuration, a profile, and an attribute associated with the chat user of the migration or a device associated with the chat user. In some embodiments, the static information includes an authorization token associated with the chat user that can be used to securely identify a communication authorized by the chat user, a device associated with the chat user, or a chat messaging service provider of the chat user.

At 404, dynamic information is received. In some embodiments, the dynamic information is sent from the sending chat server and is received at the receiving chat server. The dynamic information is associated with a chat user of the migration from the sending chat server to the receiving chat server. Dynamic information includes information that may change during the migration process. Examples of the dynamic information include received chat messages and user availability status information. In some embodiments, the dynamic information received at 404 includes information captured by the sending chat server at a specified point in time and is associated with a time identifier and/or a sequence number that can be used to determine if the dynamic information has subsequently changed. In some embodiments, dynamic information is sent separately and after the static information to minimize the amount of time between when the dynamic information is captured and received.

At 406, an indication is sent to update chat server indexing information associated with the user of the migration. In some embodiments, indicating the information includes sending a communication to a chat server indexer such as chat server indexer 110 of FIG. 1 to update its record that the user of the migration is in a migrating state where a chat message cannot be currently received by the chat server of the user. For example, while steps 402 and 404 were being processed, the sending chat server was able to receive and process any new chat message for the user. However, after the chat server indexing information is updated, a device such as the web tier system suspends sending chat information to the associated chat server of the user being migrated. Because chat messaging processing is suspended at this point, it may be desired to minimize the amount of time of the suspension. In some embodiments, the indication at 406 ensures that the dynamic information sent in 404 is not further modified.

At 408, updated dynamic information, if any, is received. In some embodiments, the updated dynamic information, if any, is sent from the sending chat server and is received at the receiving chat server. In some embodiments, because dynamic information was sent in 404 while the dynamic information could have been changed and currently the dynamic information cannot be changed due to the indication at 406, it is determined whether the dynamic information sent in 404 has changed since it was sent in 404. In some embodiments, the updated dynamic information is determined at least in part by determining whether the dynamic information sent in 404 has changed using a time identifier and/or a sequence identifier (e.g., a version number) identified when the dynamic information sent in 404 was captured. If the dynamic information has not changed, an indication that the dynamic information has not changed may be received in 408. If the dynamic information has changed, in some embodiments, only the portion with the change or the difference in the dynamic information is received at 408. In some embodiments, once the updated dynamic information has been received and processed, the process continues to 308 of FIG. 3 where the chat server indexing information indicated in 406 is updated to allow receipt of new chat messages for the user of the migration at the receiving chat server.

Figure 5:
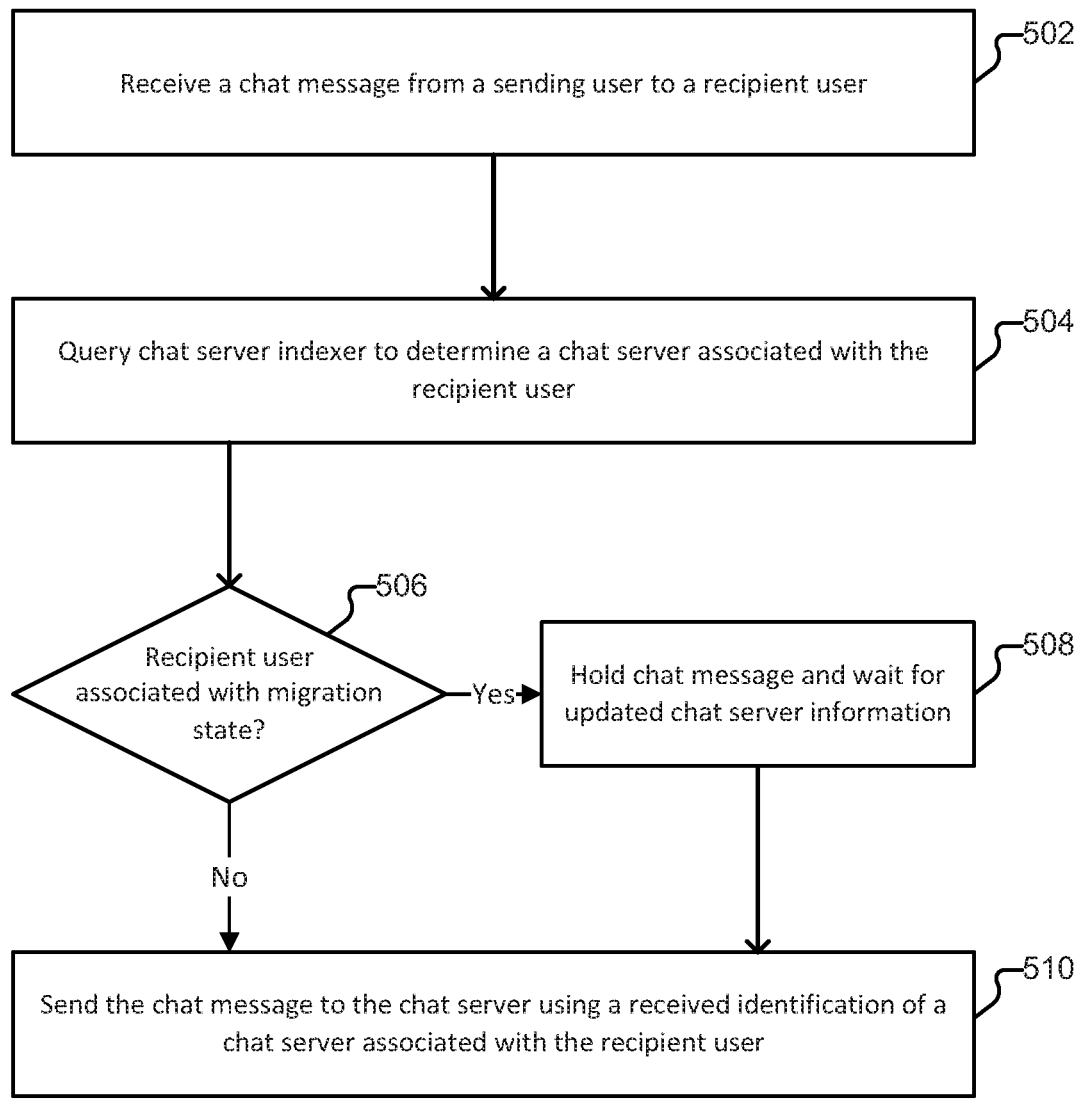
FIG. 5 is a flow chart illustrating an embodiment of a process for handling a new chat message when a chat server of a recipient user is in the process of migration.

FIG. 5 is a flow chart illustrating an embodiment of a process for handling a new chat message when a chat server of a recipient user is in the process of migration. In some embodiments, the process of FIG. 5 may be at least in part implemented in web tier system 106 or 108 of FIG. 1. At 502, a chat message for a recipient user is received from a sending user. For example a chat message is received at web tier system 106 from user system 102 to be sent to a user of user system 104. At 504, a chat server indexer is queried to determine a chat server associated with the recipient user. For example, an identifier associated with the recipient user is sent to the chat server indexer such as chat server indexer 110 of FIG. 1. In some embodiments, a chat server associated with the recipient user was cached from a previous query and a new query is made to the chat server indexer because the cached chat server indicated that the cached chat server is not handling chat message services for the recipient user. At 506, if the response of the query is not an identifier of the associated chat server but that the recipient user is associated with a state of migration, (e.g., associated with a chat server that has been suspended due to a migration), the process proceeds to 508 where the chat message is held and the process waits for updated chat server information. The updated chat server information may be determined by querying the chat server indexer periodically and/or by a dynamic message received from the chat server indexer. In some embodiments, if the updated chat server information cannot be determined for a predetermined amount of time, an indication is sent to the sending user that the chat message is undeliverable. In some embodiments, the updated chat server information includes an identifier of a new chat server associated with the recipient user. At 510, using a received identification of a chat server associated with the recipient user, the chat message is sent to the chat server.

In some embodiments, static information and dynamic information of a chat user are at least in part mirrored and maintained by at least two chat servers. For example, if one of the chat servers of the chat user becomes unable to provide chat message services for the user, another chat server that has been maintaining a mirror of the user's static and dynamic information is able to provide chat message services for the user. In this case, the user's static and dynamic information may be migrated to an additional chat server to replace the chat server that is unable to provide chat message services for the user. In various embodiments, a chat migration controller (e.g., chat migration controller 118 of FIG. 1) may coordinate at least a portion of one or more of the following: the mirroring process, the determination of which mirrored chat server provides chat messaging services for the user, the chat messaging service switchover from one mirrored chat server of the user to another mirrored chat server of the user, and migration of information to an additional chat server for mirroring.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of migrating a chat messaging service provided for a chat user, comprising:
    receiving at a second chat server from a first chat server, static information associated with a chat user;
    receiving at the second chat server from the first chat server, dynamic information associated with the chat user, wherein at least a portion of the dynamic information is received after the chat user is indicated as being associated with a migration state, and a first chat message received while the chat user is indicated as being associated with the migration state is held for later delivery until the held first chat message is delivered to the second chat server in response to detecting that the chat user is no longer indicated as being associated with a suspended chat service of the migration state, and the second chat server is a target server of the held first message, and the held first chat message is not delivered to the second chat server prior to detecting that the chat user is no longer indicated as being associated with the suspended chat service of the migration state; and
    receiving at the second chat server a second chat message for the chat user after the chat user is no longer indicated as being associated with the migration state, wherein the second chat message is from a second communication party, the second chat message is a part of a chat conversation initiated between the chat user and the second communication party prior to the chat user being indicated as being associated with the migration state.

2. The method of claim 1, wherein the static information is received before the chat user is indicated as being associated with the migration state.

3. The method of claim 1, wherein it is determined that the second chat message is no longer to be held at a third server for later delivery, at least due to determining that the chat user is no longer indicated as being associated with the suspended chat service of the migration state.

4. The method of claim 1, wherein at least a portion of the dynamic information is received before the user is indicated as being associated with the migration state.

5. The method of claim 1, wherein the portion of the dynamic information received after the user is indicated as being associated with the migration state includes an update of a version of the dynamic information received before the user is indicated as being associated with the migration state.

6. The method of claim 1, wherein the chat user is included in a group of chat users associated with a chat messaging service migration from the first chat server to the second chat server.

7. The method of claim 1, where the first chat server is configured to receive a chat message for the chat user sent before the chat user is indicated as being associated with the migration state.

8. The method of claim 1, further comprising sending a request to indicate the chat user as being associated with the migration state in a directory that maps a chat user identifier to an identifier of an associated chat server.

9. The method of claim 1, further comprising sending a request to associate the chat user with the second chat server in a directory that maps each chat user identifier of a plurality of chat user identifiers to an identifier of an associated chat server.

10. The method of claim 1, further comprising receiving an indication that a chat messaging service handled by the first chat server for the chat user is to be migrated to the second chat server.

11. The method of claim 1, wherein the chat user is indicated as being associated with the migration state in a data structure that tracks migration states of a plurality of chat users, the data structure is stored at a different server that is not the first chat server or the second chat server, and the data structure that tracks the migration states does not store the first message.

12. The method of claim 1, wherein the static information is received while the first chat server is preparing to suspend a chat messaging service of the first chat server.

13. The method of claim 1, wherein the second chat server has been selected to handle a chat messaging service for the chat user at least in part by analyzing a performance metric associated with the second chat server.

14. The method of claim 1, further comprising receiving from a chat migration controller an indication to initiate a migration process associated with the chat user.

15. The method of claim 1, wherein while the chat user is indicated as being associated with the migration state, the first chat server is suspended from modifying the dynamic information.

16. The method of claim 1, further comprising verifying the static information and the dynamic information before the chat user is no longer indicated as being associated with the migration state.

17. The method of claim 1, wherein the first server frees a resource associated with the chat user after the chat user is no longer associated with the migration state.

18. The method of claim 1, wherein the dynamic information includes a content of a previously received chat message for the chat user.

19. A system for migrating a chat messaging service provided for a chat user, comprising:
   a communication interface configured to establish a communication with a first chat server; and
   a processor coupled with the communication interface and configured to:
      receive from the first chat server, static information associated with a chat user;
      receive from the first chat server, dynamic information associated with the chat user, wherein at least a portion of the dynamic information is received after the chat user is indicated as being associated with a migration state, and a first chat message received while the chat user is indicated as being associated with the migration state is held for later delivery until the held first chat message is delivered to the system in response to detecting that the chat user is no longer indicated as being associated with a suspended chat service of the migration state, and the system is a target server of the held first message, and the held first chat message is not delivered to the second chat server prior to detecting that the chat user is no longer indicated as being associated with the suspended chat service of the migration state; and
      receive a second chat message for the chat user after the chat user is no longer indicated as being associated with the migration state, wherein the second chat message is from a second communication party, the second chat message is a part of a chat conversation initiated between the chat user and the second communication party prior to the chat user being indicated as being associated with the migration state.

20. A computer program product for migrating a chat messaging service provided for a chat user, the computer program product being embodied in a non-transitory computer readable storage medium and comprising computer instructions for:
   receiving at a second chat server from a first chat server, static information associated with a chat user;
   receiving at the second chat server from the first chat server, dynamic information associated with the chat user, wherein at least a portion of the dynamic information is received after the chat user is indicated as being associated with a migration state, and a first chat message received while the chat user is indicated as being associated with the migration state is held for later delivery until the held first chat message is delivered to the second chat server in response to detecting that the chat user is no longer indicated as being associated with a suspended chat service of the migration state, and the second chat server is a target server of the held first message, and the held first chat message is not delivered to the second chat server prior to detecting that the chat user is no longer indicated as being associated with the suspended chat service of the migration state; and
   receiving at the second chat server a second chat message for the chat user after the chat user is no longer indicated as being associated with the migration state, wherein the second chat message is from a second communication party, the second chat message is a part of a chat conversation initiated between the chat user and the second communication party prior to the chat user being indicated as being associated with the migration state.

* * * * *